United States Patent Office 3,474,044
Patented Oct. 21, 1969

3,474,044
PHOSPHORUS-NITROGEN POLYMERS
Harold Goldwhite, 5151 State College Drive, Los Angeles, Calif. 90032; Robert Neville Hazeldine, Wendridge, Lyme Road, Cheshire, Disley, England; and David George Rowsell, 5151 State College Drive, Los Angeles, Calif. 90032
No Drawing. Continuation-in-part of application Ser. No. 293,289, July 8, 1963. This application July 22, 1966, Ser. No. 567,055
Claims priority, application Great Britain, July 10, 1962, 26,446/62
Int. Cl. C08g 33/16
U.S. Cl. 260—2                                13 Claims

ABSTRACT OF THE DISCLOSURE

Monomeric compounds and polymers consisting essentially of structural units

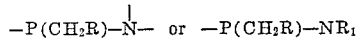

wherein R represents a univalent radical selected from the group consisting of hydrogen, halogen, alkyl, chlorofluoroalkyl, polyfluoroalkyl, aryl and polyfluoroaryl and $R_1$ represents a univalent radical selected from the group consisting of hydrogen, alkyl, aryl and aralkyl which are produced by reacting a primary $\alpha,\alpha$-dihalogenoalkyl phosphine of the formula $R \cdot CX_2 \cdot PH_2$, X representing halogen, with a compound of the formula $R_1NH_2$ whereby 2 molecules of hydrogen halide are eliminated for each molecule of primary phosphine.

---

This application is a continuation-in-part of our application Ser. No. 292,289, filed on July 8, 1963, now abandoned.

The present invention relates to the manufacture of novel compounds including polymers having a phosphorus-nitrogen backbone.

It is an object of the present invention to provide phosphorus-nitrogen polymers having excellent thermal stability which are unchanged by prolonged heating at 200° C. and to provide polymers which undergo only relatively slight decomposition even when heated at 400–500° C.

It is a further object of the invention to provide phosphorus-nitrogen polymers which are viscous involatile oils at normal temperatures and which may be used as high temperature hydraulic fluids.

It is yet a further object of the invention to provide phosphorus-nitrogen polymers which are unreactive solids which may be applied as films to form heat resistant and fire-retardant coatings.

It is another object of the invention to provide phosphorus-nitrogen polymers which form extremely stable laminates with fibrous materials.

It is an additional object of the invention to provide a facile route to the new phosphorus-nitrogen polymers which process may be carried out within a wide range of pressures and temperatures.

In accordance with the present invention these objects are achieved by providing phosphorus-nitrogen compounds having units of the structure

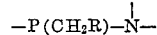

wherein R represents a univalent radical selected from the group consisting of hydrogen, halogen, alkyl, chlorofluoroalkyl, polyfluoroalkyl, aryl and polyfluoroaryl radicals; and in particular compounds having the structure

wherein R is as defined above and $R_1$ represents a univalent radical selected from the group consisting of hydrogen, alkyl, and aryl and aralkyl radicals. By "polyfluoro" is meant fluoro-substitution greater than difluoro-substitution.

The new phosphorus-nitrogen compounds are preferably prepared by reacting a compound having the formula $R_1NH_2$ where $R_1$ is a univalent radical selected from the group consisting of hydrogen, alkyl, aryl and aralkyl radicals with a primary $\alpha,\alpha$-dihalogenoalkyl phosphine having the formula $R \cdot CX_2 \cdot PH_2$, wherein R represents a univalent radical selected from the group consisting of a hydrogen, halogen, alkyl, chlorofluoroalkyl, polyfluoroalkyl, aryl and polyfluoroaryl radicals, and X represents a halogen, whereby two molecules of hydrogen halide are eliminated for each molecule of primary phosphine and a product is obtained which contains a chain consisting of alternate phosphorus and nitrogen atoms and having the unit structure —P(CH₂R)—N—.

Where R is alkyl or polyfluoroalkyl it is preferably lower alkyl or lower polyfluoroalkyl having up to four carbon atoms.

For primary amines (i.e. where $R_1$ is not hydrogen) the reaction may be formally representated by the equation,

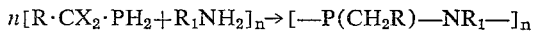

where R, $R_1$ and X are as hereinbefore defined, and by control of the reaction conditions cyclic compounds may be isolated in which $n=2$, 3 or 4 or which are linear polymers in which the main chain consists of alternate phosphorus and nitrogen atoms. Non-polymeric compounds obtained from this reaction are ring compounds having respectively four-, six- or eight-membered rings when $n=1$, 2 or 3 as exemplified in the accompanying structural formulae.

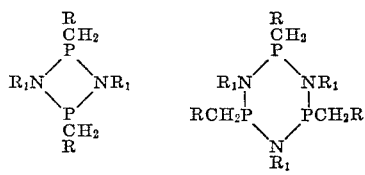

On reaction with ammonia a polymer having an empirical formula $(R \cdot CH_2P)_3N_2$ is produced, although products having a formula $(R \cdot CH_2P-NH)_n$ analogous to those obtained with primary amines may be obtained by suitable control of the reaction conditions.

The polymer produced when ammonia (i.e. $R_1$ is hydrogen) reacts with a primary phosphine of general formula R·CX$_2$·PH$_2$ may have the highly cross-linked general structural formula,

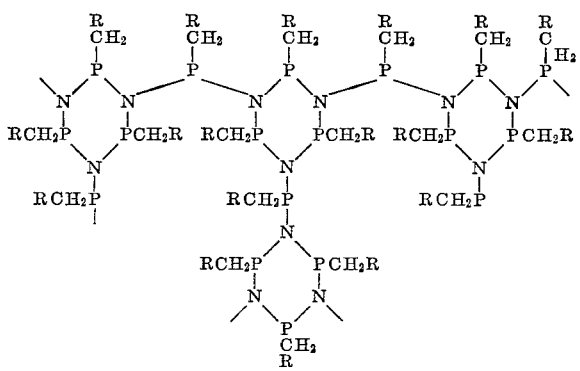

or the substantially linear general structural formula,

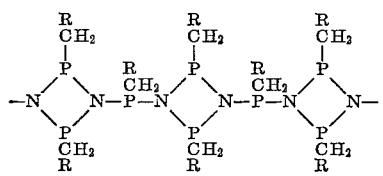

or it may be a mixture of various structural types. By control of the reaction conditions a polymer may be obtained in which one or other of the structure types is predominant.

When ammonia and a primary amine are together reacted with a primary phosphine the reaction results in the formation of intermediates such as

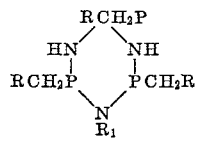

which homopolymerise in a linear manner. Cross linking is thus controlled.

If the group RCX$_2$ of the primary phosphine RCX$_2$PH$_2$ contains a halogen other than fluorine on the carbon atom of the group R which is attached to the CX$_2$ group, loss of hydrogen halide from the RCH$_2$ group of the polymers (RCH$_2$P)$_3$N$_2$ or (RCH$_2$P.NR$_1$)$_n$ may occur when an excess of ammonia or the primary amine R'NH$_2$ is used. Vinyl compounds of the type (>C=CHP)$_3$N$_2$,

(>C=CHPNR$_1$)$_n$ are thus produced. The vinyl groups are useful in providing sites for cross-linking or for further polymerisation via the vinyl group.

The reaction is extremely facile, occurring when the reactants are merely brought together in the gas or liquid phase or in an inert solvent. The facility of the reaction is such that although it is normally carried out at about atmospheric pressure and between about 50° C. and ambient temperature, the reaction still occurs at extreme limits of pressure, (such as about 1 mm. Hg and 300 atmospheres) and of temperature (such as about —100° C. and 300° C.). The ratio of the reactants is not critical for reaction to occur and can vary from 1:5 to 10:1 for the molar ratio of ammonia or primary amine to primary phosphine, or there may be an even more overwhelming excess of basic reactant over primary phosphine, up to 30:1 say. An excess of ammonia or primary amine is preferred to absorb the hydrogen halide produced and other hydrogen halide acceptors may be used instead of excess ammonia or primary amine.

The time of reaction is dependent upon the other parameters and normally is between about 0.1 to 100 hours but longer times are necessary in certain conditions, for example reactions carried out at low temperature in dilute solution.

Although reaction occurs within the wide limits specified above, variation of the reaction conditions within these limits enables the products of the reaction to be controlled. For example with a molar ratio of ammonia to phosphine of up to 10:1, the product obtained is highly cross-linked polymer having the empirical formula (R.CH$_2$.P)$_3$N$_2$, but when the ratio is about 20:1, compounds corresponding to the formula (R.CH$_2$P.NH)$_n$ may be produced in which $n=2$–$100$.

These new polymeric compounds provided by the present invention may be either viscous involatile oils or unreactive solids. They are normally resistant to attack by cold concentrated aqueous alkali and by non-oxidising concentrated aqueous acids both in the cold and when heated. They have marked resistance to common solvents and are extremely stable to thermal degradation: no decomposition occurs below about 400° C., and there is no weight loss on heating up to 300° C. for periods of several hours. The solid polymers are useful as laminates, e.g. when the intermediate molecular weight polymer [CHF$_2$.CH$_2$P.NH]$_n$ is heated with asbestos, cross-linking results to form a stable laminate. The liquid polymers may be used as stable fluids.

By way of example, the reaction between $\alpha,\alpha$-difluoroalkyl phosphines and ammonia and/or a primary amine will now be described.

Example 1

A mixture of 1,1,2,2-tetrafluoroethyl phosphine (3.0 g.) and ammonia (12.0 g.) at —80° C. in a pressure vessel of volume 350 ml. is allowed to warm slowly up to room temperature and stand at that temperature for 16 hours. The excess of ammonia is evaporated and the remaining solid washed with water to yield a yellow solid (1.7 g.) with an empirical composition of C$_6$H$_9$F$_6$P$_3$N$_2$. (Calculated for C$_6$H$_9$F$_6$P$_3$N$_2$: C, 22.8%; H, 2.9%; N, 8.9%. Found: C, 22.8%; H, 3.0%; N, 8.5%.)

This solid is unaffected by temperature up to 400° C. The side chains on the P-N cyclic framework are believed to be CHF$_2$.CH$_2$ groups.

Example 2

A stream of 1,1,2,2-tetrafluoroethyl phosphine (4.4 g.) is diluted with nitrogen and bubbled into liquid ammonia (150 g.) at —78° C. The yellow solution is evaporated and the solid extracted with methanol. After ammonium fluoride is filtered off the methanol is evaporated to yield a yellow solid, which is soluble in organic solvents. The empirical composition of the polymer produced is (CHF$_2$.CH$_2$.P—NH)$_n$. Calculated for C$_2$H$_4$F$_2$PN, C, 21.6%; H, 3.6%. Found: C, 20.9%; H, 3.5%. Molecular weight, 1400, $n$ approx. 13.

Example 3

Trifluoromethyl phosphine (1.8 g.) reacts with ammonia (5.0 g.) in the way described in Example 1 to produce a solid (2.0 g.) having an empirical composition of C$_3$H$_6$F$_3$P$_3$N$_2$. (Calculated for C$_3$H$_6$F$_3$P$_3$N$_2$: N, 12.7%. Found: 12.7%). The side chains on the P-N cyclic framework are believed to be CH$_2$F groups.

Example 4

When 2-chloro-1,1,2-trifluoroethyl phosphine (3.9 g.) is allowed to react with ammonia (6.0 g.) in the way described in Example 1 a yellow heat stable product (1.9 g.) with the empirical composition C$_6$H$_6$F$_3$P$_3$N$_2$ is produced.

Under these basic reaction conditions loss of hydrogen chloride from the (CHFCl.CH$_2$)$_3$P$_3$N$_2$ has occurred to give a polymer containing vinyl groups which has the empirical formula (CHF=CH)$_3$P$_3$N$_2$. (Calculated for C$_6$H$_6$F$_3$P$_3$N$_2$: C, 28.1%; H, 2.3%; N, 10.9%. Found: C, 25.9%, 26.4%; H, 2.0%, 3.4%; N, 11.3%, 10.1%.)

Example 5

A mixture of 1,1,2,2-tetrafluoroethyl phosphine (5.5 g.) and methylamine (6.3 g.) in a pressure vessel of volume 350 ml. at −80° C. is allowed to warm slowly to room temperature, when a exothermic reaction occurs. After removal of excess methylamine (1.8 g.) the residue is washed with water and dried to give a yellow, heat-stable solid (5.0 g.) of M.P. 170° C. It has the empirical constitution $C_3H_6F_2PN$ (Calculated for $C_3H_6F_2PN$: C, 28.8%; H, 4.8%; N, 11.2%. Found: C, 28.1%; H, 4.2%; N, 10.8%) corresponding to $[CHF_2.CH_2P.NMe]_n$.

Example 6

Aniline (19.5 g.) and 1,1,2,2-tetrafluoroethyl phosphine (7.1 g.) in dry ether (200 ml.) are heated in a sealed vessel at 100° C. to give aniline hydrofluoride and a yellow solid polymer (8.0 g.). [Found: C, 52.0%; H, 4.3%; N, 7.6%; $(CHF_2.CH_2.P.N.C_6H_5)_n$ requires C, 52.0%; H, 4.3%; N, 7.6%]. The polymer is thermally stable at 250° C. and is soluble in alcohols and phenol.

Example 7

Benzylamine (6.65 g.) and 1,1,2,2-tetrafluoroethylphosphine (1.56 g.) in dry ether are heated in a sealed vessel at 100° C. to give benzylamine hydrofluoride and a yellow solid polymer (2.6 g.). The polymer has the empirical constitution $(CHF_2.CH_2.P.N.CH_2.C_6H_5)_n$. [Found: C, 52.1%; H, 5.9%; N, 7.7%; P, 16.6%. Required: C, 53.4%; H, 5.9%; N, 6.7%; P, 15.4%.]

Example 8

Aniline and 1,1-difluoroethylphosphine, $CH_3CF_2PH_2$, are heated together under the conditions of Example 6 to yield a polymer having the formula $$(CH_3.CH_2.P.N.C_6H_5)_n$$

Example 9

Ammonia and 1,1-difluoroethylphosphine are reacted at a temperature below −10° C. to yield rapidly the polymer $(CH_3.CH_2.P.NH)_n$ mixed with the polymer $$(CH_3.CH_2.P)_3N_2$$

Example 10

Ammonia and α,α-difluorobenzylphosphine, $$C_6H_5.CF_2.PH_2$$

are reacted at room temperature to give a polymer of formula $(C_6H_5.CH_2.P.NH)_n$ admixed with a compound of empirical formula $(C_6H_5.CH_2.P)_3N_2$. Further reaction of this mixed polymer with $C_6H_5.CF_2.PH_2$ reduces the number of NH groups in the polymer and produces material which closely approaches empirical formula $(C_6H_5.CH_2.P)_3N_2$.

We claim:

1. A polymer which consists essentially of structural units having the formula $$[-P(CH_2R)-\overset{|}{N}-]_n$$

in which R represents a univalent radical selected from the group consisting of hydrogen, halogen, alkyl, chlorofluoroalkyl, polyfluoroalkyl, aryl and polyfluoroaryl radicals, and $n$ is an integer greater than 4.

2. A polymer according to claim 1 wherein R is selected from the group consisting of fluorine, difluoromethyl, chlorofluoromethyl, and phenyl radicals.

3. A polymer which consists essentially of structural units having the formula $$[-P(CH_2R)-NR_1]_n$$

wherein R represents a univalent radical selected from the group consisting of hydrogen, halogen, alkyl, chlorofluoroalkyl, polyfluoroalkyl, aryl, polyfluoroaryl radicals and $R_1$ represents a univalent radical selected from the group consisting of hydrogen, alkyl, aryl and aralkyl radicals and $n$ is an integer over 4.

4. A polymer according to claim 3 wherein R is selected from the group consisting of fluorine, difluoromethyl, chlorofluoromethyl and phenyl radicals.

5. A polymer according to claim 3 wherein $R_1$ is selected from the group consisting of hydrogen, methyl, phenyl and benzyl radicals.

6. A process for the manufacture of compounds containing phosphorus and nitrogen, which comprises reacting at a temperature between −100° C. and +300° C. a compound having the formula $R_1NH_2$ where $R_1$ is a univalent radical selected from the group consisting of hydrogen, alkyl, aryl and aralkyl radicals with a primary α,α-dihalogenoalkyl phosphine having the formula $R.CX_2.PH_2$, wherein R represents a univalent radical selected from the group consisting of hydrogen, halogen, alkyl, chlorofluoroalkyl, polyfluoroalkyl, aryl and polyfluoroaryl radicals, and X represents a halogen, whereby two molecules of hydrogen halide are eliminated for each molecule of primary phosphine and a product is obtained which contains a chain consisting of alternate phosphorus and nitrogen atoms.

7. A process according to claim 6 in which the halogen X is fluorine.

8. A process according to claim 6 in which R is a fluorinated lower alkyl group.

9. A process according to claim 6 in which R is a fluorine atom.

10. A process according to claim 6 in which the group R contains a halogen atom other than fluorine on the carbon atom which is attached to the $CX_2$ group and in which the proportion of $R_1NH_2$ to $R.CX_2.PH_2$ employed is greater than an equimolar proportion and results in the elimination of hydrogen halide from the $R.CH_2$ groups in the initially obtained product to produce compounds containing a >C=H— group attached to the phosphorus atom.

11. A process according to claim 10 in which the halogen X is fluorine.

12. A process according to claim 10 in which R is a fluorinated lower alkyl group.

13. A process according to claim 6 in which said reaction is carried out at pressures between about 1 mm. Hg and 300 atmospheres and the molar ratio of the reactant $R_1NH_2$ and $R.CX_2PH_2$ is between about 1:5 and 30:1 and for a period of 0.1 to over 100 hours.

References Cited

UNITED STATES PATENTS 3,239,561    3/1966    Johns et al. _____ 260—551

SAMUEL H. BLECH, Primary Examiner

U.S. Cl. X.R.

117—136; 252—78; 260—37, 80, 551